United States Patent [19]

Marshall

[11] Patent Number: 5,196,713
[45] Date of Patent: Mar. 23, 1993

[54] OPTICAL POSITION SENSOR WITH CORNER-CUBE AND SERVO-FEEDBACK FOR SCANNING MICROSCOPES

[75] Inventor: Daniel R. Marshall, Tucson, Ariz.

[73] Assignee: Wyko Corporation, Tucson, Ariz.

[21] Appl. No.: 882,581

[22] Filed: May 13, 1992

Related U.S. Application Data

[63] Continuation-in-part of Ser. No. 748,460, Aug. 22, 1991.

[51] Int. Cl.$^5$ .......................... G01J 1/20; G01N 23/00
[52] U.S. Cl. ................................. 250/561; 250/201.1; 250/306; 250/234
[58] Field of Search ..................... 250/306, 307, 201.2, 250/201.4, 201.3, 216, 561, 234, 235, 236; 73/105; 356/400

[56] References Cited

U.S. PATENT DOCUMENTS

| | | | |
|---|---|---|---|
| 4,449,084 | 5/1984 | Meno | 318/640 |
| 4,625,103 | 11/1986 | Kitamura et al. | 250/201.4 |
| 4,841,191 | 6/1989 | Takata et al. | 250/306 |
| 4,928,019 | 5/1990 | Tomikawa et al. | 250/561 |
| 4,952,857 | 8/1990 | West et al. | 318/561 |
| 5,026,998 | 6/1991 | Holzl | 250/561 |
| 5,047,633 | 9/1991 | Finlan et al. | 250/307 |
| 5,059,793 | 10/1991 | Miyamoto et al. | 250/307 |
| 5,144,150 | 9/1992 | Yoshizumi et al. | 250/561 |

FOREIGN PATENT DOCUMENTS 2028-702-A 1/1990 Japan.
2203-205-A 8/1990 Japan.

OTHER PUBLICATIONS

"A Scanning Tunneling Microscope With A Capacitance-Based Position Monitor", by Griffith et al., Journal of Vacuum Science Technology, Nov./Dec., 1990, pp. 2023-2027.

"Optical Scan-Correction System Applied To Atomic Force Microscopy", by Barrett and Quate, Rev. Sci. Instrum. 62(6), Jun. 1991, American Institute of Physics, pp. 1393-1399.

Primary Examiner—David C. Nelms
Assistant Examiner—Michael Messinger
Attorney, Agent, or Firm—Charles R. Hoffman

[57] ABSTRACT

A scanning probe microscope includes a probe support carrying a scanning probe, a piezoelectric transducer having a free end connected to a stage on which the sample is supported, probe sensing circuitry connected to sense a signal indicating interaction between the tip of the probe and a point of the sample surface and producing in response thereto a Z control voltage so as to optimize the interaction and produce a Z coordinate representing the height of a presently scanned point of the sample surface. Optical sensing circuitry includes a light source connected in fixed relation to the sample stage, a position sensitive photodetector, and optics focusing lens for focusing a portion of the light onto a position sensitive detector to cause it to produce X and Y position signals. The light source includes a retroreflector attached to the piezoelectric transducer receiving a beam from a stationary laser and focused by a stationary lens onto the position sensitive detector. Feedback servo circuits are responsive to the X and Y position signals to apply X and Y control voltages to the piezoelectric transducer.

14 Claims, 6 Drawing Sheets

_Fig. 8_

_Fig. 9_

OPTICAL POSITION SENSOR WITH CORNER-CUBE AND SERVO-FEEDBACK FOR SCANNING MICROSCOPES

CROSS-REFERENCE TO RELATED APPLICATION

This is a continuation-in-part of commonly assigned patent application Ser. No. 748,460 entitled "OPTICAL POSITION SENSOR FOR SCANNING MICROSCOPES", filed Aug. 22, 1991, by the present inventor.

FIELD OF THE INVENTION

The present invention relates mainly to the field of scanning microscopy, and in particular to accurate control and measurement of the position of a moving sample or moving probe. The invention also relates more generally to optical techniques for very precisely measuring the position and movement of an object.

BACKGROUND OF THE INVENTION

Figure 1:
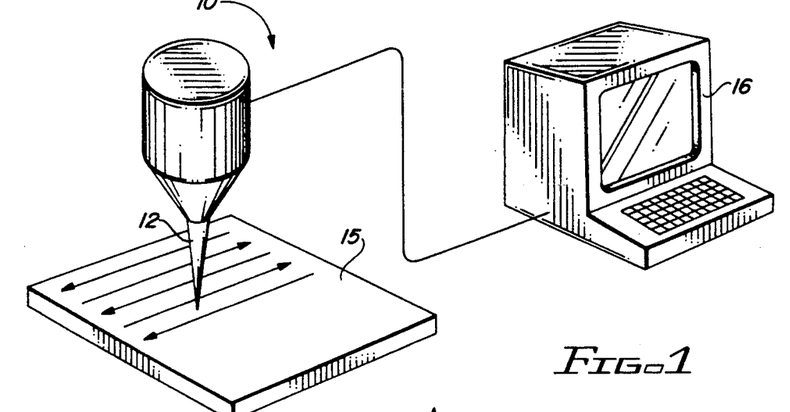
FIG. 1 is a schematic diagram of a scanning microscope.

A scanning probe microscope analyzes a succession of small areas which make up the test sample, in contrast to a conventional optical microscope, which forms an image of the sample simultaneously over the entire field of view of the sample. In a scanning probe microscope, the information pertaining to each small area is stored and processed, and recombined into a composite image, much as a television reconstructs an image using a "flying" spot on a picture tube. Scanning probe microscopes figure prominently in a number of areas of research and technology where interactions and features of very small size are important. FIG. 1 shows a schematic diagram of a scanning probe microscope 10 which includes a probe 12 for analyzing a sample 15. The measured data is processed and recombined into a composite image on screen 16.

An important type of scanning probe microscope uses a high precision mechanical actuator to scan the active region of the microscope over the sample, or conversely, to scan the sample past the active region. The microscope's active region may, for example, be defined by a focused beam of light or other energy, or it may be defined by a very local interaction between a probe tip and the sample. Two examples of the latter type of microscope are the Scanning Tunneling Microscope (STM) and the Atomic Force Microscope (AFM). Using short range interactions between the probe and the sample, and by carefully controlling the relative motion between the probe and the sample, it is possible to extend well beyond the resolution limits of conventional optical microscopes, down even to atomic dimensions.

Figure 2:
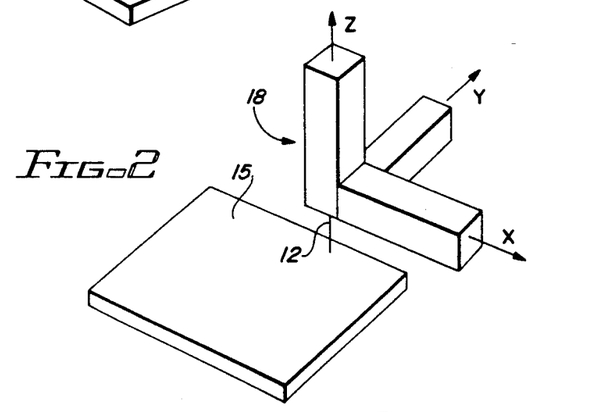
FIG. 2 is a schematic diagram of a type of scanning probe microscope in which the active region is defined by a very local interaction between a probe tip and the sample, as in a Scanning Tunneling Microscope (STM) or a Atomic Force Microscope (AFM).

FIG. 2 is a schematic drawing of a typical scanning probe (e.g. STM or AFM) microscope actuator and probe tip. To achieve the highest possible sensitivity and resolution while achieving the least possible distortion of the geometrical features of the object, the scanning motion of the sample or probe must be very well controlled.

Piezoelectric transducers of a variety of compositions and geometries have been used for precise motion control. (The abbreviation "PZT" is used in the drawings to designate piezoelectric transducers in a general sense, although technically the abbreviation "PZT" refers specifically to piezoelectric transducer ceramic material composed of lead, zirconium, and titanium.) Such transducers are capable of controlled motion with resolutions of 0.1 nanometer or better, with ranges of motion of several micrometers. However, there are several problems associated with the use of piezoelectric transducers, including hysteresis, non-linearity (sensitivity which varies with range), changes in sensitivity over time, drift or creep (position which changes over time), and mechanical (spring-mass) resonances of the scanning element at relatively low frequencies. For example, over large scan ranges (e.g., over 10 micrometers), hysteresis and non-linearity may cause severe distortion of the scanned image. Furthermore, spring mass resonances may limit scanning speeds, as such resonances must be allowed to decay before scanning is continued. Prior scanning probe microscopes have either accepted errors introduced by nonlinearity and/or hysteresis in actuators or have partially corrected errors due to nonlinearity by means of error-correcting algorithms in a digital computer. (It is very difficult to effectively eliminate errors due to hysteresis in this manner).

Prior techniques employed to overcome such problems have not been entirely successful, especially where it has been desirable to extend the scanning range of the device beyond a few micrometers. Some researchers have corrected scanned images with reference to interferometric or capacitance based distance measuring techniques. However, those techniques tend to be cumbersome, sensitive to alignment, and expensive. For example, see "A Scanning Tunneling Microscope with a Capacitance-based Position Monitor", by Griffith et al., Journal of Vacuum Science Technology, pages 2023-2027 Nov./Dec. 1990. This reference describes removal of inaccuracies in probe position measurements. The described device is very sensitive to tilt produced by the piezoelectric transducer. Use of capacitive sensors to achieve two-dimensional sensing as described therein is cumbersome because it is difficult to provide all of the necessary mechanical components in a suitably small volume. Furthermore, capacitive position sensors, because they sense very small changes in the ambient electrical field, are vulnerable to electromagnetic interference, which is very undesirable because the capacitive position sensor must operate in a very noisy electrical environment.

As an example, the problem of drift is particularly acute when the sample to be imaged is small and complicated, such as are most biological molecules, for example, proteins, deoxyribonucleic acid ("DNA") or the like. A molecule of DNA on the average is about 3 nanometers wide and about 100 nanometers long. At a typical STM scanning speed of three lines/second, an image of the DNA molecule can be generated in 1-2 minutes. Unfortunately, the piezoelectric transducer drift is commonly in the range of 5-10 nanometers per minute, which severely affects the resolution of the DNA molecule image. The piezoelectric transducer drift can be reduced to about 1 nanometer per minute if a large scan (on the order of 100 nanometers × 100 nanometers) is used. However, that size of scan is too large for biological molecules, which are usually scanned in a field of about 10 nanometers × 10 nanometers. With that size of scan and a piezoelectric transducer drift of 5-10 nanometers per minute, the image of a DNA molecule would be a blur.

Thus, the prior art has suffered from a lack of a suitable position sensor for measuring the position of a scanned element. It is important that such means have the correct combination of range, stability, resolution, physical compactness, low mass, simplicity, high frequency bandwidth, relative insensitivity to tilt and misalignment, low cost, and freedom from creep (i.e., drift), nonlinearity, and hysteresis. Availability of such a position sensing system would greatly improve scanning microscopy by correcting the defects of piezoelectric transducer-like actuators, either through after-the-fact corrections to measured data or through real-time servomechanical control of the moving element.

SUMMARY OF THE INVENTION

Accordingly, it is an object of the invention to provide a scanning probe microscope which is capable of high accuracy with a larger linear range of measurement than has been achieved in the closest prior art.

It is another object of the present invention to provide a scanning probe microscope which is capable of faster scanning with higher levels of accuracy than is possible with the closest prior art.

It is another object of the invention to provide a scanning probe microscope with a position sensor which is simpler and more economical in structure than the position sensors of the closest prior art.

It is another object of the invention to provide the scanning probe microscope which is less sensitive to tilting motion introduced by a piezoelectric transducer than has been achieved in the closest prior art.

It is another object of the invention to provide precise three-dimensional measurements using a scanning probe microscope without using focus sensing techniques.

It is another object of the invention to provide a technique for separation of measurements in an x,y plane from those in a z direction to allow separate optimization of resolution of measurements in the x,y plane and measurements in the z direction.

Briefly described, and in accordance with one embodiment of the present invention, a scanning probe microscope includes a probe support carrying a scanning probe so that a tip of the scanning probe is very close to or contacts a surface of a sample, a piezoelectric transducer having an anchored end and a free end connected to a stage on which the sample is supported, probe sensing circuitry connected to sense a signal representative of an interaction between the tip of the probe and a point of the surface of the sample closest to the tip and producing in response thereto a Z control voltage that moves the stage so as to optimize the local interaction and produce a Z coordinate representing the height of the point at which the local interaction has been optimized, and optical sensing circuitry including 1) a light source connected in fixed relation to the sample stage and moveable in the same directions as the sample stage, 2) a position sensitive photodetector, and 3) optics for directing a spot portion of the light onto the position sensitive photodetector to cause it to produce a first X position signal and a first Y position signal. First and second feedback circuits are responsive to the first X position signal and the first Y position signal, respectively, producing a second X position signal and a second Y position signal. A first error circuit receives the second X position signal and a requested X signal and produces an X error signal representative of a difference therebetween. A second error circuit receives the second Y position signal and a requested Y signal and produces a Y error signal representative of a difference therebetween. First and second amplifier circuits receive the X error signal and the Y error signal, respectively, and produce an X control voltage and a Y control voltage, respectively, applied to the X and Y control inputs of the piezoelectric transducer. In one described embodiment, the light source includes a stationary laser producing a beam which is focused over a path which includes a retroreflector mounted on the stage and returned to the photosensitive detector. In another embodiment, a beamsplitter directs part of the focused beam onto the retroreflector, which returns that part of the beam back through the beamsplitter and through a lens to produce the spot portion of the light on the position sensitive device. This embodiment can provide adjustment of the magnification and hence the range and resolution of the scanning probe microscope.

In another embodiment, first and second mutually perpendicular corner cubes or retroreflectors are mounted on the stage or other movable objects and first and second beams are optically guided into the first and second retroreflectors. The resulting first and second return beams impinge on first and second lateral position sensitive detectors, respectively. In one configuration, the first lateral position sensitive detector detects movement of the stage or object in the y,z plane and the second lateral position sensitive detector detects movement of the stage or object in the x,z plane, so accurate measurement of the position of the object or plane in the x, y, and z directions is obtained. In another configuration, the first lateral position sensitive detector detects movement of the stage or object in the X,y plane and the second lateral position sensitive detector detects movement of the stage or object in the z direction, effectuating very precise movement of stage or object position in all three coordinate axis directions, but with different sensitivity and range for motion in the x,y plane and motion in the z direction.

DETAILED DESCRIPTION OF THE PREFERRED EMBODIMENTS

The present invention accurately controls and measures the position of a moving sample or a probe of a scanning probe microscope by projecting a spot of light correlated with the moving element onto an optoelectronic detector using optical elements which adjust range, sensitivity and output. Additional electronic circuitry is used for subsequent signal processing and system control. An optoelectronic detector in many ways is an ideal transducer for incorporation into a scanning probe microscope because of its potentially high bandwidth, its non-contact method of measurement, and because of the flexibility with which the operating characteristics may be tailored to particular applications. The optoelectronic detector used in this invention preferably is a lateral effect position sensitive detector (PSD), because of the extended range and linearity achievable thereby. A Model S2044 Lateral Effect PSD available from Hamamatsu Photonics K.K., Solid-State Division, of Hamamatsu, Japan or a lateral effect position sensitive detector marketed by UDT Sensors, Inc. of Hawthorne, Calif. as part number DLS4 is suitable. However, other position sensors, such as a segmented detector, also could be used successfully.

Figure 3:
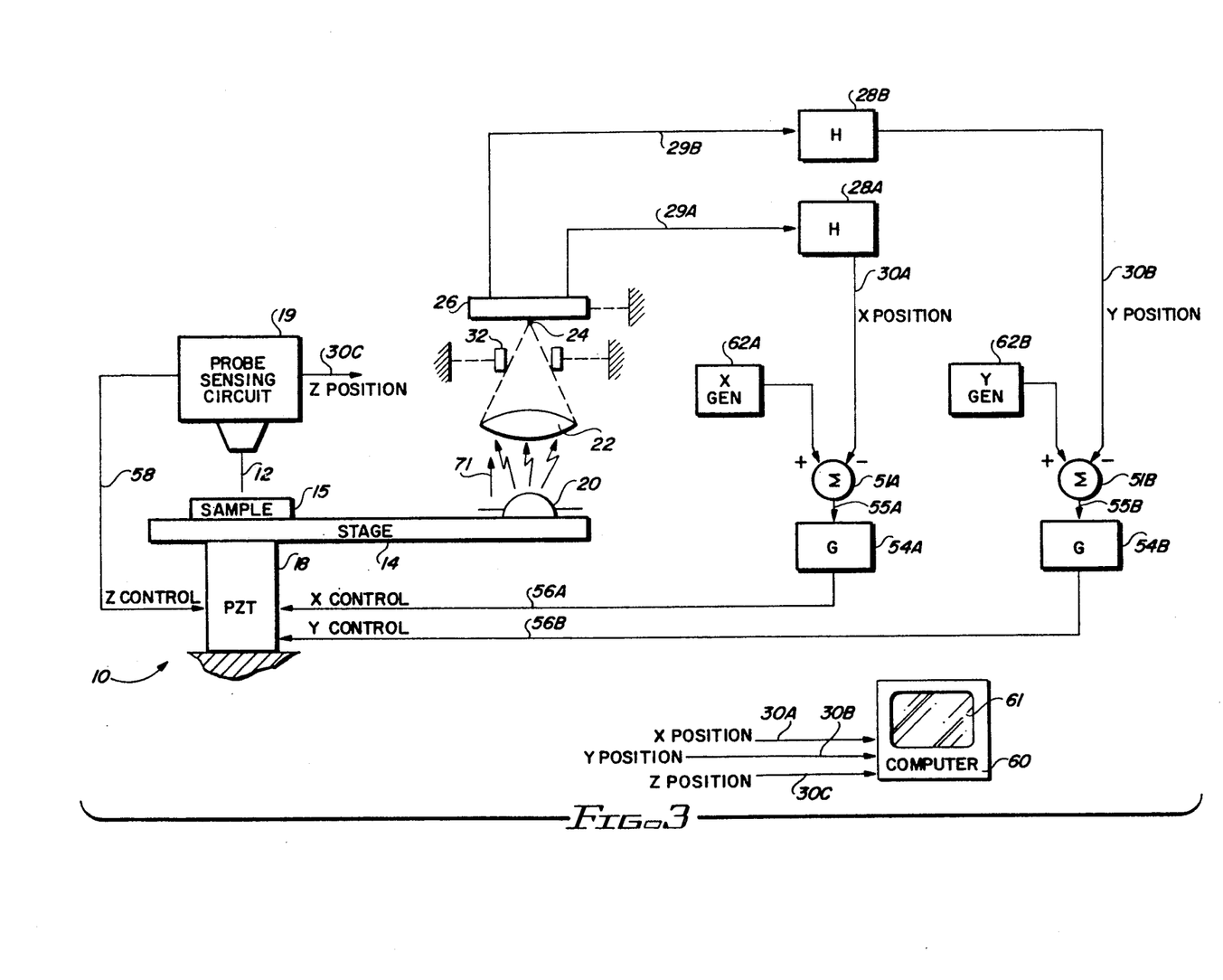
FIG. 3 is a schematic diagram of an embodiment of the present invention including a moving light source.

Referring to the first embodiment of the present invention illustrated in FIG. 3, a piezoelectric transducer 18, the lower end of which is solidly anchored and the upper end of which is free, is used as a high precision scanning mechanical actuator in a scanning probe microscope. Piezoelectric transducer 18 receives X, Y, and Z input control voltages on conductors 56A, 56B, and 58, respectively. Sample stage 14 is attached to the free, moveable end of piezoelectric transducer 18 so as to be moveable in the X, Y, and Z coordinate directions in response to the Z input control voltages, to allow profiling of the surface of a sample 15 that is supported by sample stage 14.

The tip of probe 12 is held stationary with respect to X and Y a minute distance above the surface of sample 15 in the case of an STM, or in contact with the surface of sample 15 in the case of an AFM. Probe sensing circuitry 19, which can be readily implemented by those skilled in the art for an STM or an AFM, produces the Z control signal on conductor 58 to adjust the height of the upper surface of sample 15 relative to the position of the tip of probe 12.

The X control voltage is produced on a conductor 56A by an amplifier circuit 54A having a transfer function G. The input of amplifier 54A is connected by conductor 55A to the output of a summing circuit 51A which produces an error signal on conductor 55A proportional to the difference between an X position signal produced on conductor 30A and a "requested X coordinate" signal produced by X generating circuit 62A. Conductor 30A is connected to an X position output of a feedback circuit 28A which receives an X position input signal on conductor 29A from lateral effect position sensitive detector 26 in accordance with the location thereon of image or spot 24. The transfer function of feedback circuit 28A is H.

Similarly, the Y control voltage on conductor 56B is generated by amplifier circuit 54B in response to an error signal produced on conductor 55B by summing circuit 51B in response to the difference between a Y position signal on conductor 30B and a "requested Y coordinate" signal produced by Y generating circuit 62B. Conductor 30B is connected to a Y position output of a feedback circuit 28B in response to a Y position input signal produced on conductor 29B by lateral effect PSD 26 in accordance with the location of image 24 thereon. Feedback circuit 28B also has a transfer function H. Computer 60 can generate commands to cause X generating circuit 62A and Y generating circuit 62B to produce the "requested X coordinate" and "requested Y coordinate" signals.

The piezoelectric transducer 18 imparts motion to the sample 15, which sample motion, without feedback, may depart slightly from its desired motion because of hysteresis, creep, geometric design, etc. of piezoelectric transducer 18. Alternatively, sample 15 can remain stationary while probe 12 is moved by a piezoelectric transducer.

A small light source 20 is attached in fixed relation to the free end of piezoelectric transducer 18, for example, to sample stage 14. A collecting optical element such as a lens 22 receives light from moving light source 20 and projects a moving light image or spot 24 onto a stationary lateral effect position sensitive detector 26.

While any source of light can be used that provides a sufficiently bright spot, a diode laser is particularly attractive, provided that special care is exercised in the choice and design of the laser source assembly so that the apparent motion of the light source 20A has positional stability at least as good as that of the required measurement. A laser diode has a resonant optical cavity, and as used in the present invention, feedback of light from the measuring system in the form of reflections etc. can destabilize the laser diode to the extent that it is insufficiently stable for high resolution measurements. Therefore the type of laser must be selected carefully, system reflections must be avoided, and the optical elements that collect light from the laser diode must be designed to enhance laser stability.

As sample stage 14 moves, lens 22 projects light spot 24 onto stationary detector 26, and light spot 24 accurately recreates and tracks the motion of sample 15 produced by piezoelectric transducer 18. Electrical circuitry 28A and 28B attached to detector 26 creates corresponding X and Y position signals 30A and 30B which can be used to correct for nonideal movement of sample 15 by piezoelectric transducer 18 by moving sample 15 toward "requested X coordinate" and the "requested Y coordinate" positions until the error signals on conductors 55A and 55B are essentially zero.

Other functionally equivalent arrangements of elements are possible. For example, the positions of light source 20 and detector 26 can be interchanged. Also, light source 20 and detector 26 can remain stationary while a screening aperture or lens connected to the free end of piezoelectric transducer 18 moves. The advantage of the last approach is that the parts of the invention requiring electrical connections may be made stationary.

Because the moving element, which may be either probe 12 or sample 15, may depart from ideal or desired motion, the light collecting optical system should be desensitized to motion of the light source perpendicular to the sample plane. For this reason, it is preferred to position a stationary light limiting aperture 32 so as to impart telecentricity to the system, to assure that the centroid of light spot 24 projected onto detector 26 will not move laterally in response to axial motion (i.e., in the direction of arrows 71) of light source 20, even though the apparent size of the light spot may change slightly. When the optoelectronic detector 26 is a lateral effect position sensitive detector, such telecentricity will assure that the above perpendicular motion of the light source 20 is not misinterpreted as motion in the plane of sample 15.

Lens 22, the optical collecting element in this embodiment, thus forms image 24 of light source 20. This image moves through space in a manner which accurately represents the movement of light source 20. The two dimensional position sensor 26 captures the two-dimensional motion of light source 20 in the plane of sample 15, and is desensitized to motion of light source 20 perpendicular to the plane of sample 15. The collecting optical system may be chosen with appropriate magnification to select a range and sensitivity suitable to the scanning probe microscope.

Figure 4:
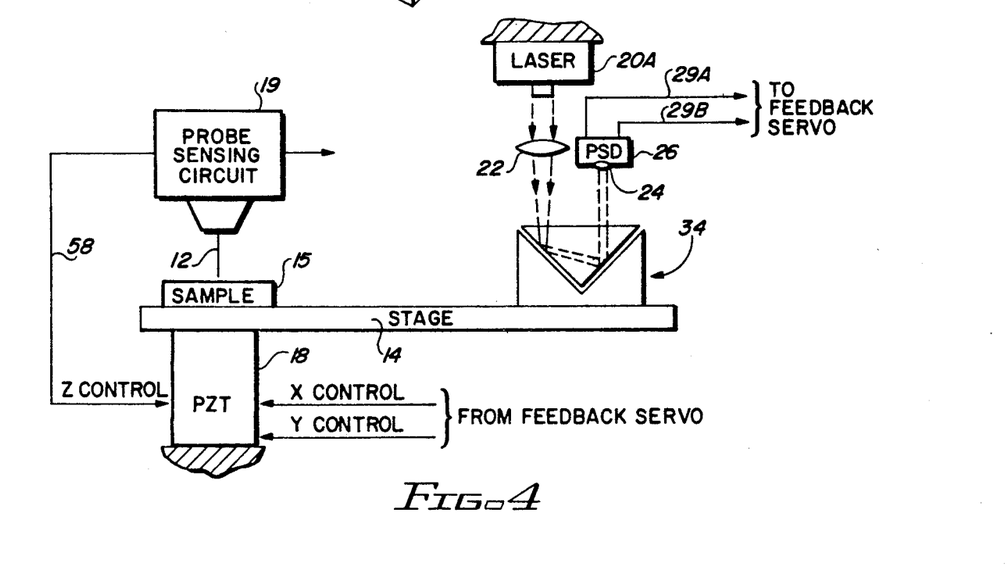
FIG. 4 is a schematic diagram of another embodiment of the present invention including a moving corner cube or retroreflector.

A second embodiment of the present invention is shown in FIG. 4. In this embodiment, retroreflector or corner cube 34 is attached to piezoelectric transducer 18, in this case by mounting it on stage 14, and reflects the path of all incoming rays about its vertex 36 so that image 24 of stationary lens light source 20A appears to translate in the same directions as vertex 36 moved by piezoelectric transducer 18, but with a 2X magnification. Stationary lens 22 collects light from laser 20A and directs it into moving retroreflector 34 which projects a moving light spot 24 onto stationary position sensing detector 26, which generates signals 29A and 29B as previously described with reference to FIG. 3. Note that the light traveling between lens 22 and position sensor 26 is not collimated.

Because of the direction preserving properties inherent in corner cube 34, there is negligible error introduced by tilt of the corner cube, for relatively small angles. Any small tilt error introduced by the optical thickness of a solid, transparent corner cube may be removed either by using a hollow corner cube or by applying a calibrated correcting factor to a given assembly of actuator and corner cube. Changing the magnification of lens 22 does not change the sensitivity of position measurement. (It should be noted that this is an unconventional way of using a corner cube in converging light. Corner cubes are mostly used in collimated, rather than uncollimated, light to return an image in a way which is unaffected by small rotations of the corner cube. i.e., the corner cube is usually used as a tilt-insensitive mirror for collimated light.)

In converging light, the corner cube as used herein becomes a "probe" for motion of the structure (piezoelectric transducer 18) to which the corner cube is connected. Furthermore, the corner cube as used herein is a motion-sensing "probe" which has ideal properties for a position sensor for a piezoelectric transducer, namely, tilt insensitivity, good stability over time and geometric stability in presence of shock, vibration, etc., precise response to rapid motion, excellent linearity, freedom from hysteresis, low mass, physical compactness, relatively low cost, and very high resolution.

Figure 5:
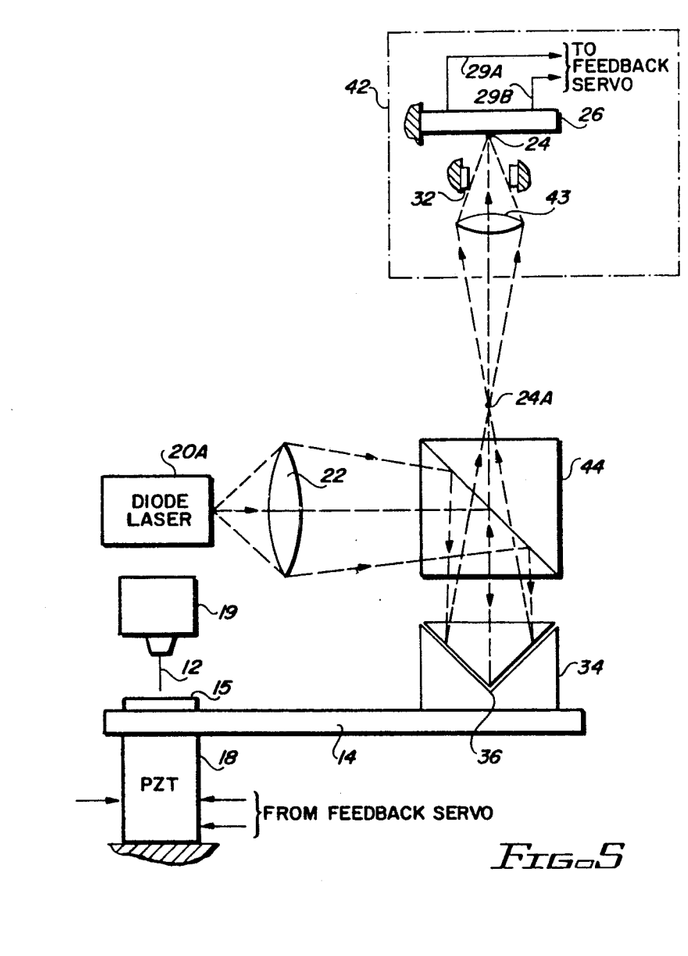
FIG. 5 is a schematic diagram of another embodiment of the present invention.
Figure 6:
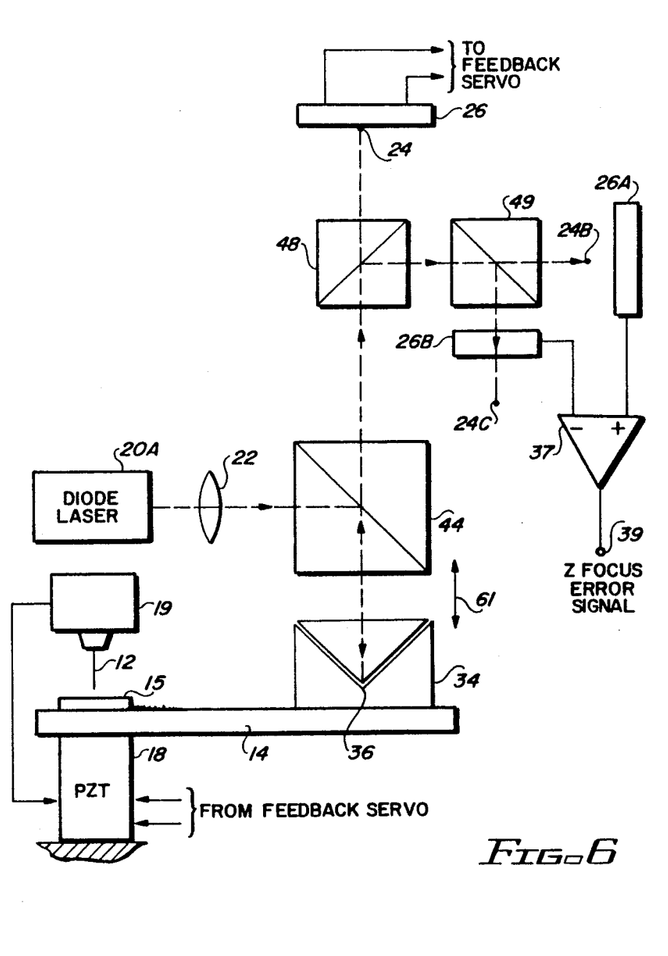
FIG. 6 is a schematic diagram of another embodiment of the present invention including axial motion sensing capability.

Since laser 20A in FIGS. 4-6 is stationary, and the corner cube 34, which is low in mass, rigid, and highly stable, and requires no electrical connection to any other component, it provides a high degree of "noise immunity" from vibrations, distortion of the movement of sample stage 14, etc. Furthermore, corner cube 34 dissipates no heat, so there is no distortion of its location as a result of thermal variation in the dimensions of sample stage 14.

Laser 20A can be desensitized to spurious reflections by putting an aperture between the laser and the light collecting optics between laser 20A and position sensitive detector 26. Because lens 22 of FIGS. 4-6 focuses the collimated light coming from laser 20A, causing the exiting rays to converge as they approach retroreflector 34, the light returned in the direction of the aperture is very much out of focus, and very little is returned to the laser cavity. The laser operation therefore remains stable. To achieve still more stable operation, a superluminescent diode, such as a L3302 marketed by Hamamatsu of Japan can be used instead of a laser. Tilt insensitivity is inherent with retroreflectors. Corner cubes typically are constructed of the solid glass, and therefore their dimensions are stable over time, and the solid, rigid structure is generally insensitive to shock and vibration. The absence of wires which would be present for a light source mounted as shown in FIG. 1 avoids shock and vibration that could be conducted through such wires.

A third embodiment of the present invention is shown in FIG. 5, wherein an optical relay system 42 includes a second lens 43 and telecentric aperture 32 to transfer an intermediate image 24A of stationary laser 20A to stationary position detector 26. The level of magnification in the optical relay system 42 may be chosen over a wide range of suitable values and sensitivities. This embodiment and the embodiment of FIG. 4 preserve the advantages previously described in the embodiment of FIG. 3, while further enhancing the removability and simplicity of the actuator assembly by eliminating any need for electrical connection between the moving portion and the stationary portion. In the embodiment of FIG. 5, first beamsplitter 44 allows a smaller corner cube 36 to be used than is used in the embodiment of FIG. 4.

A fourth embodiment of the present invention is illustrated in FIG. 6, wherein a second beamsplitter 48, a third beamsplitter 49, and two three-element photodiode arrays 26A and 26B have been introduced into the optical beam to supply light to a subassembly the purpose of which is to measure axial motion of vertex 36 of corner cube 34. Focused spots 24B and 24C are thereby produced. It should be noted that the prior art includes a wide variety of axial motion or focus sensing methods, only some of which can work in the present application. The reason focus sensing is difficult in the present application is that the spot 24B moves in all of the X, Y, and Z coordinate directions. A focus sensing technique that can work is the structure shown in FIG. 6, which provides common mode noise rejection in the generation of a focus error signal that is obtained by taking the difference between the output signals produced by three-element photodiode arrays 26A and 26B. Difference amplifier 37 measures the difference to produce the focus error signal on conductor 39. This technique is described in more detail on page 812 of "Optical Scanning", Gerald Marshall, editor, Marcel Dekker, 1991. The three-element photodiode arrays 26A and 26B are commonly used in optical disk drives for computers, and are available from Hamamatsu Photonics K.K., Solid State Division of Hamamatsu, Japan. In combination with parallel motion sensors 26 and 26A as described above, this embodiment makes it possible to precisely characterize actuator motion simultaneously in three orthogonal dimensions.

It should be appreciated that full benefit of using corner cube 34 is not achieved unless care is exercised in selection of the position sensing detector and the light source. Lateral effect position sensitive detectors provide large range with excellent resolution and bandwidth.

Figure 7:
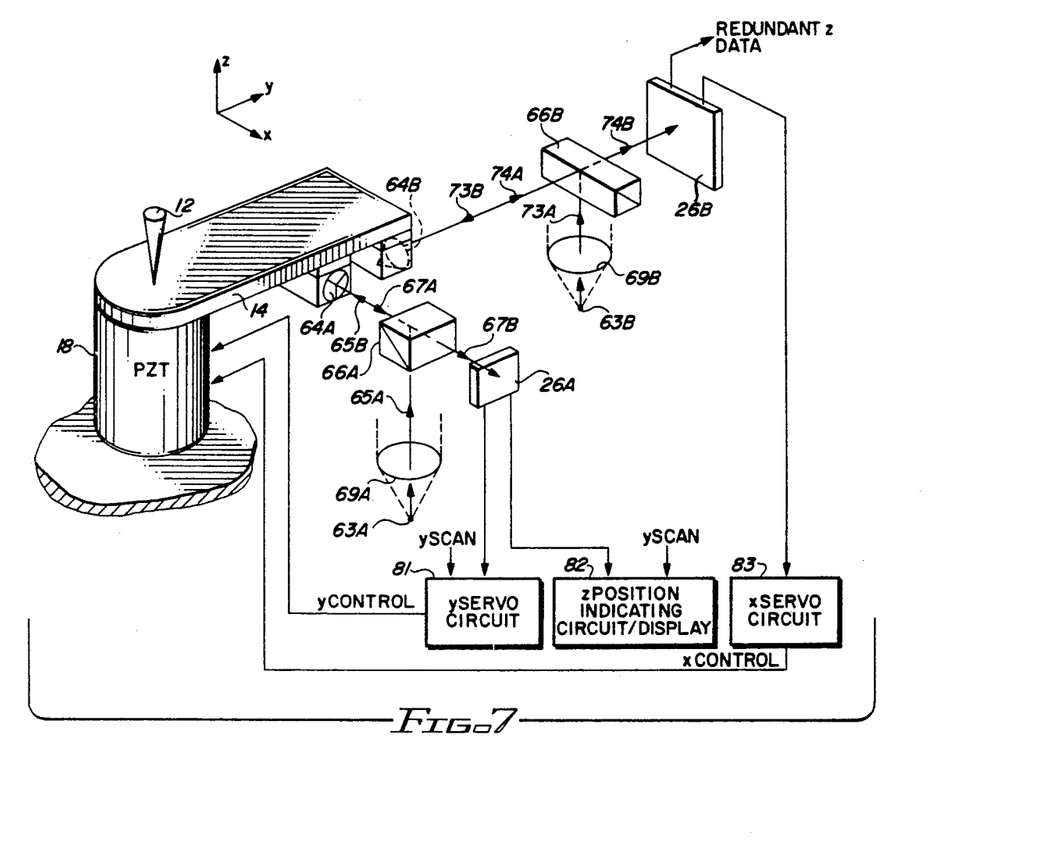
FIG. 7 is a diagram of an embodiment of the invention utilizing lateral position sensors to accurately measure piezoelectric transducer motion in the x, y, and z directions.

FIG. 7 shows another embodiment of the invention in which movement of stage 14 in the z direction due to scanning by piezoelectric transducer tube 18 is more accurately obtained than in the embodiment of FIG. 6. Two corner cubes 64A and 64B are attached to stage 14, aligned so that their optical axes lie in mutually perpendicular planes. A light source 63A (either a laser diode or a superluminescent diode) produces light that is focused by lens 69A to produce a focused beam 65A, which enters a beamsplitter 66A. (Fifty percent of that light is lost, the other fifty percent constituting beam 65B.) Beam 65B enters corner cube 64A and is reflected back (in the manner characteristic of a corner cube) in the x direction as beam 67A.

Beam 67A enters beamsplitter 66A which reflects half of it back into light source 63A and passes the other half to form beam 67B. Beam 67B impinges on lateral positive sensitive detector 26A. Movement of stage 14 in the x, y, and z directions by piezoelectric transducer tube 18 causes like movement of corner cube 64A, causing corner cube 64A to translate beam 67A in the y,z plane. The outputs of lateral position sensitive detector 26A are connected to feedback circuits such as 28A and 28B in FIG. 3 to generate y and z error signals that are used to produce the y control signal and y and z position signals.

Similarly, a second light source 63B is focused by lens 69B to produce a beam 73A that enters beamsplitter 66B. Half of beam 73A is reflected as beam 73B, which enters and is returned by corner cube 64B in the y direction as beam 74A. The return beam 74A enters beamsplitter 66B, reflecting half of it back into the light source 63B and transmitting the other half as beam 74B onto lateral position sensitive detector 26B. Beam 74B moves on detector 26B in the x,z plane. The outputs of lateral position sensitive detector 26B are connected to feedback circuits such as 28A and 28B in FIG. 3 to produce x and z error signals that are used to produce the x control signal, an x position signal, and a redundant z position signal.

Thus, the embodiment of FIG. 7, using the closed loop technique of FIG. 3 to control the x and y scanning of piezoelectric transducer 18, produces very accurate scanning that eliminates the hysteresis and non-linearity of piezoelectric transducer 18. Only the errors of the lateral position detectors 26A and 26B produce positional errors of the test sample in stage 14. Furthermore, the z sensing capability similarly removes hysteresis and non-linearity errors in the z (height) measurements.

Figure 8:
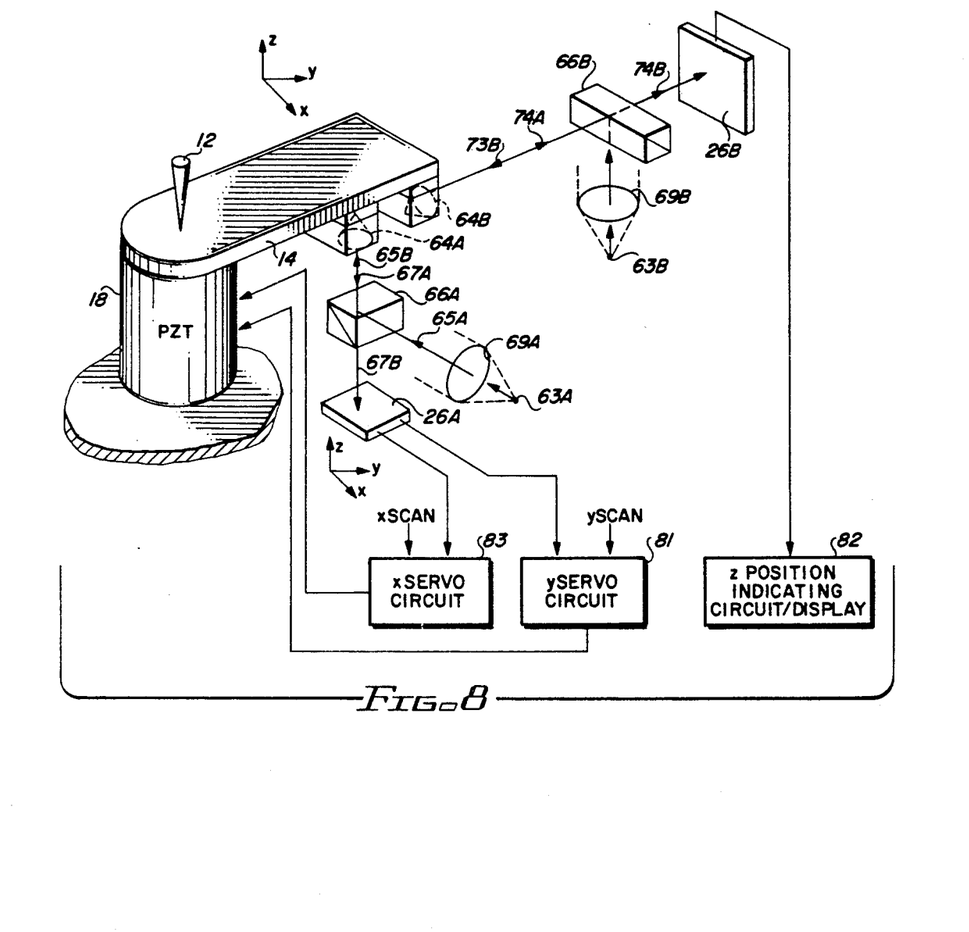
FIG. 8 is a diagram of another embodiment of the invention using lateral position sensors to accurately measure piezoelectric transducer motion in the x, y, and z directions.

FIG. 8 shows an embodiment of the invention similar to that of FIG. 7, except that the optical axis of corner cube 64A is oriented in the z direction rather than the x direction, and beamsplitter 66A, lens 69A, light source 63A, and lateral position sensitive detector 26A are positioned accordingly. The outputs of lateral position sensitive detector 26A are summed with the output of an x command generator such as 62A in FIG. 3 and a y command generator such as 62B of FIG. 3 to generate the x control and y control signals such as on conductor 56A and 56B, respectively, in FIG. 3 to thereby achieve very precise x,y "lateral" scanning of stage 14 by piezoelectric transducer 18. A second corner cube 64B and its associated optics including beamsplitter 66B, laser or superluminescent diode 63B, beamsplitter 66B, and lateral position sensor 26B produce outputs which represent the z position. The benefits are similar to those of the previous embodiment, except that the magnification may be optimized for the z coordinate measurement.

The use of closed loop feedback and lateral position sensors in the embodiments of the invention described above eliminates the effect of hysteresis in piezoelectric transducer 18. However, lateral position sensitive detectors 26, 26A, and 26B may have residual linearity errors. Any such errors are transferred directly to the corresponding x,y position coordinates of stage 14 by the closed loop feedback system.

Figure 9:
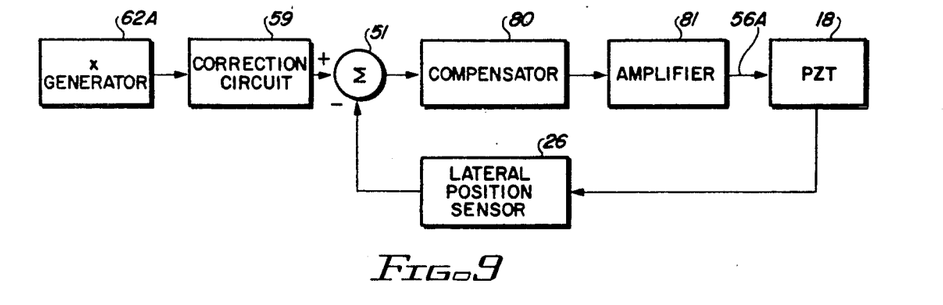
FIG. 9 is a diagram illustrating use of a system in which a lookup table is utilized to correct piezoelectric transducer motion measurements for non-linearities of a lateral position sensor.
Figure 9A:
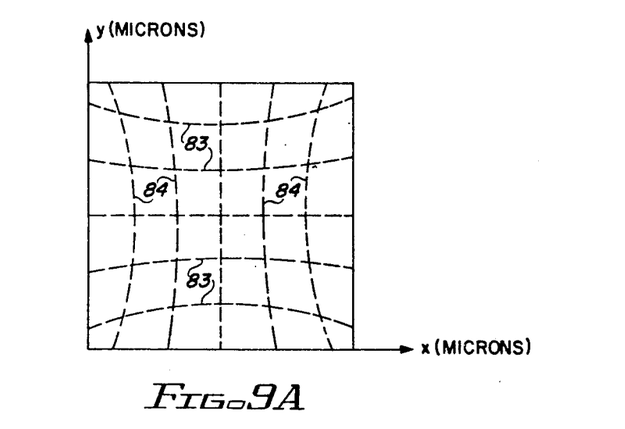
FIG. 9A is a diagram useful in illustrating the effect of non-linearities in a lateral position sensing detector.

FIG. 9A illustrates this problem, wherein dotted lines 83 (which ideally should be straight lines) represent lines along which lines of constant x or y signal levels of a lateral position sensitive detector might lie. If there is no compensation for such linearity errors, the sample 15 (FIG. 3) will be scanned along lines that correspond precisely to the constant x or y values indicated by numerals 83 and 84 in lateral position sensitive detector 26.

In accordance with the present invention, such non-linearities in the lateral position sensitive detectors are corrected or compensated for by using techniques shown in the circuit of FIG. 9. In FIG. 9, x scan generator 62A produces an x scanning signal that is applied to a digital correction circuit 59, the output of which is applied to the non-inverting input of summing circuit 51. The output of summing circuit 51 is input to a compensator circuit 80. Correction circuit 59 corrects any residual sensor non-linearity errors (such as those shown in FIG. 9A) for the present value of x. Compensator circuit 80 is a conventional servo loop circuit that compensates, e.g., for mechanical spring-mass resonance of the piezoelectric transducer 18.

The above correction can be accomplished conveniently by rapid reference to a lookup table that has been generated by comparing actual scan positions of stage 14 to a standard x,y reference and storing the error values. In the preferred embodiments of the invention, x generator 62A is implemented as a scan algorithm in a digital computer. Correction circuit 59 also is implemented in the digital computer to correct the $X_{SCAN}$ signal (which typically has a linear triangle staircase waveform) produced by x generator 62A to correct for the non-linearities in lateral position sensitive detector 26. A similar method is used to correct residual y coordinate non-linearities in detector 26.

If desired, the linearity errors of position sensitive detector 26 can be characterized by polynomial expressions which have been curve-fit to the actual linearity errors of detector 26 measured relative to a standard error-free linear grid reference.

Figure 10:
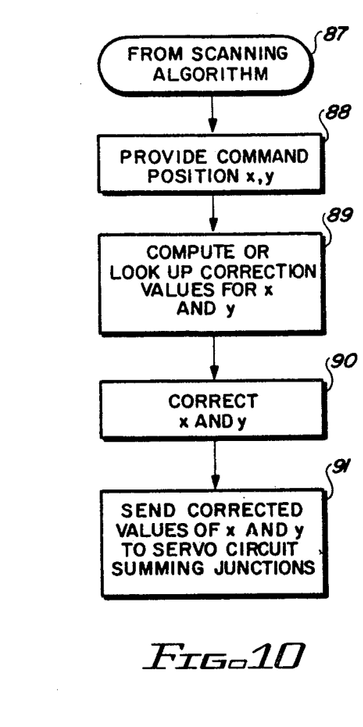
FIG. 10 is a flow diagram of a computer program utilized in the system of FIG. 9 to correct measurements of three-dimensional piezoelectric transducer motion for non-linearities in a lateral position sensor.

The methodology for the foregoing error correction is shown in the flowchart of FIG. 10. The x and y scanning signals are produced by a computer scanning algorithm to generate the present command position x,y, as indicated in block 88. These present values of x and y are used to refer to lookup tables that produce the needed x and y correction values representing the corresponding linearity errors of the lateral position sensitive detectors, as indicated in block 89. As indicated in block 90, those correction values are combined with the present values of x and y, which then are input to the x control signal error amplifier and y control signal error amplifier, which produce error signals that are amplified to produce the x and y control signals as indicated in block 92. Non-linearities associated with the z detection described in connection with FIGS. 6, 7, and 8 may be similarly corrected.

Figure 11:
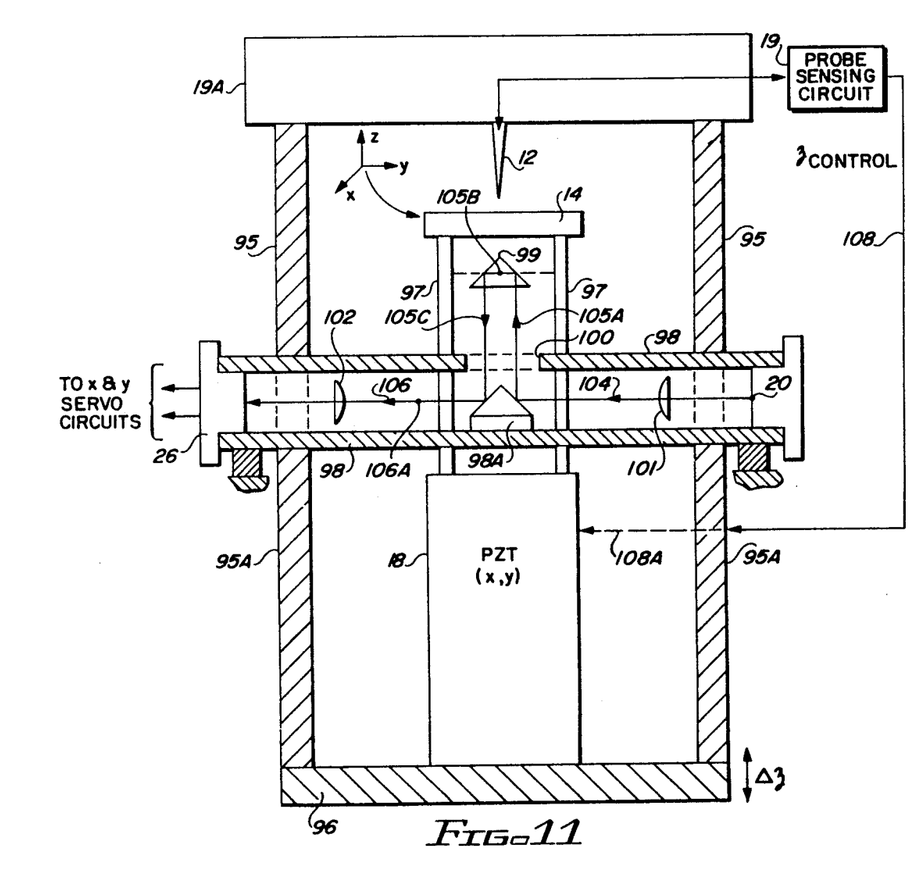
FIG. 11 is a schematic section view diagram of a preferred embodiment of the invention illustrating structural support for the various optic elements.

FIG. 11 illustrates the physical structure of a preferred embodiment of the invention. Piezoelectric transducer tube 18 (which receives control signals to effectuate lateral scanning of stage 14 in the x and y directions and vertical movement of stage 14 in the z direction) is anchored at its lower end to a support base 96. A piezostrictive transducer tube 95A (composed of lead, magnesium, and niobium ceramic material, which has very little hysteresis) is attached to support base 96. Piezostrictive transducer tube 95A is supported by stationary horizontal tube 98. A stationary upper tube 95 is supported by horizontal tube 98. A probe support 19A is attached to the top of stationary tube 95, and supports probe 12. Probe sensing circuitry 19 is electrically coupled to probe 12 for the purpose of sensing atomic force measurements or probe current measurements.

Stage 14 is supported in fixed relationship to the top of piezoelectric transducer tube 18 by a suitable number of rigid legs 97. Horizontal stationary optical tube 98 is supported in fixed relationship to tube 95, and extends between support legs 97, through suitable openings on opposite sides of vertical support tube 95. Corner cube or retroreflector 99 is rigidly supported by legs 97, so that it moves in fixed relationship to the top end of piezoelectric transducer 18 during scanning thereof in the x, y, and z directions.

Scanning in the x,y plane of piezoelectric transducer 18 and stage 14 is accomplished by $x_{CONTROL}$ and $y_{CONTROL}$ voltages as shown in the earlier drawings. The relative z position between probe 12 and the sample (not shown) on stage 14 is produced by the $z_{CONTROL}$ signal on conductor 108 applied to piezostrictive transducer 95A to produce movement Δz of support base 96, which imparts z motion to piezoelectric transducer 18 and hence to stage 14. (Or, z motion of stage 14 could be produced by applying the $z_{CONTROL}$ voltage to piezoelectric transducer 18, as indicated by 108A.)

A ninety degree folding mirror prism, with two mutually perpendicular upper mirror surfaces, is attached to a bottom inner surface of optical tube 98, which preferably is composed of INVAR metal, to provide thermal stability. Light source apparatus 20, which produces a point source of light 103, is supported in the right hand end of optical tube 98. It produces a beam that is focused by lens 101 to produce beam 104. Beam 104 impinges on one of the mirror surfaces of folding mirror prism 98, producing a vertical beam 105A. Beam 105A enters corner cube 99, which is rigidly attached in fixed relation to stage 14. Beam 105A is internally reflected in corner cube 99 three times to produce two beams designated by 105B and return beam 105C, return beam 105A being laterally displaced from entry beam 105A. An opening 100 in the upper surface of optical tube 98 accommodates entry beam 105A and return beam 105C. Beam 105C strikes the opposite mirror surface of folding mirror prism 98A, producing beam 106.

Beam 106 produces an image spot or focus spot 106A which moves in three dimensions in accordance with movement of corner cube 99 in three dimensions. Beam 106 is focused by lens 102 onto lateral position sensitive detector 26 producing a magnified point image of spot 106A. The magnification by lens 102 improves the resolution obtainable in obtaining values of the x, y, and z coordinates of the points of the sample being scanned. The outputs of detector 26 are coupled to suitable amplifier circuitry, as previously described with reference to FIG. 3.

The above use of folding mirror prism 98A in optical tube 98 provides a compact, simplified optical layout, because the bulky right-angled optical paths associated with use of beamsplitters in other designs are avoided. Furthermore, seventy-five or greater percent losses of signal associated with use of a beamsplitter (because the beamsplitter loses half of the optical input signal on each reflection) are avoided. The improved signal-to-noise ratio increases the resolution of scanning in the x,y directions in the embodiment of FIG. 11. Although this embodiment of the invention shows only x,y scanning, it is possible to include z measurements, either with an axial (focus) sensing element or with an additional corner cube oriented at a right angle relative to corner cube 99.

The foregoing optical layout technique makes it practical to accomplish profiling of the sample with only about 0.5 percent positional error over the normal field. Additional correction of the linearity errors of detector 26 can reduce profiling inaccuracy still further. This technique is a great improvement over the accuracy accomplished by prior systems, in which errors may be as high as twenty-five percent of the measured values.

This embodiment of the invention, as in the previous embodiments, also provides use of a corner cube to detect physical motion of a member in the manner described above to produce a focus point such as 106A, the movement of which replicates the movement of the corner cube. The movement of the focus point can be translated to accurate x, y, and z coordinates representing motion of the member or object to which the corner cube is attached. The optical tube and folding mirror technique shown in FIG. 11 could be extended to implement the techniques shown in FIGS. 7 and 8. Two optical tubes such as 98 could be positioned with mutually perpendicular longitudinal axes lying in horizontal planes with their associated corner cubes rigidly connected to stage 14 to implement the scheme of FIG. 7. To implement the scheme of FIG. 8, two optical tubes such as 98 could be used to interact with their associated corner cubes connected to stage 14, one oriented to have its optical axis vertical and the other oriented to have its optical axis horizontal. And, of course, the structure may be modified to have the stage 14 stationary and the probe support movable, by piezoelectric transducer 18.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, a scanning microscope that does not include a physical probe such as probe 12, and instead scans with a beam which acts as a probe, is within the intended scope of the invention.

What is claimed is:

1. A scanning probe microscope, comprising in combination:
   (a) a probe support carrying a microscope probe so that a tip of the microscope probe is proximate to a surface of a sample;
   (b) a piezoelectric transducer having an anchored end and a free end connected to one of the probe support and a stage on which the sample is supported;
   (c) probe sensing circuitry connected to sense a signal representative of an interaction between the tip of the probe and a point of the surface of the sample closest to the tip and producing in response thereto a first control voltage applied to the piezoelectric transducer that moves the one of the probe support and the stage along an axis of a first coordinate variable so as to optimize the interaction;
   (d) optical circuitry including
      i. a first corner cube connected in fixed relation to the one of the probe support and stage and producing a first beam of light and means for directing the first beam of light along an axis of a second coordinate variable, the first beam of light moving transversely with respect to the axis of the second coordinate variable in accordance with movement of the one of the probe support and the stage,
      ii. a second corner cube connected in fixed relation to the one of the probe support and stage and producing a second beam of light and means for directing the second beam of light along an axis of a third coordinate variable, the second beam of light moving transversely with respect to the axis of the third coordinate variable in accordance with movement of the one of the probe support and the stage,
      iii. a first position sensitive photodetecting device receiving the first beam of light, the first beam of light producing thereon a first spot of light that moves in accordance with the movement of the one of the probe support and the stage to cause the first position sensitive photodetecting device to produce a first signal representing a value of the first coordinate variable and a second signal representing a value of the third coordinate variable,
      iv. a second position sensitive photodetecting device receiving the second beam of light, the second beam of light producing thereon a second spot of light that moves in accordance with the movement of the one of the probe support and the stage to cause the second position sensitive photodetecting device to produce a third signal representing a value of the second coordinate variable;
   (e) a first feedback servo circuit receiving the third signal and a first scanning signal and producing in response thereto a first error signal, and a second servo circuit receiving the second signal and a second scanning signal and producing in response thereto a second error signal; and
   (f) means responsive to the first and second error signals for producing second and third control voltages applied to the piezoelectric transducer that move the one of the probe support and the stage along axes of the second coordinate variable and the third coordinate variable, respectively.

2. The scanning probe microscope of claim 1 wherein the second, third, and first coordinate variables are cartesian coordinate x, y, and z variables, respectively.

3. The scanning probe microscope of claim 1 wherein the one of the probe support in the stage is the stage.

4. The scanning probe microscope of claim 2 further including means for displaying values of the first, second, and third coordinate variables x, y, and z.

5. The scanning probe microscope of claim 1 including means for determining a linearity error of the first position sensitive photodetecting device corresponding to a present value of the first coordinate variable and accordingly adjusting the present value of the first coordinate variable to compensate for the linearity error of the first position sensitive photodetecting device.

6. The scanning probe microscope of claim 5 including means for determining linearity errors of the first and second position sensitive photodetecting devices corresponding to present values of the second coordinate variable and the third coordinate variable and accordingly adjusting the present values of the second coordinate variable and the third coordinate variable, whereby the first and second feedback servo circuits cause translation of the piezoelectric transducer along axes of the second coordinate variable and the third coordinate variable to be compensated for the linearity errors of the first position sensitive photodetecting device and the second position sensitive photodetecting device.

7. A scanning probe microscope, comprising in combination:
   (a) a probe support carrying a microscope probe so that a tip of the microscope probe is proximate to a surface of a sample;
   (b) a piezoelectric transducer having an anchored end and a free end connected to one of the probe support and a stage on which the sample is supported;
   (c) probe sensing circuitry connected to sense a signal representative of an interaction between the tip of the probe and a point of the surface of the sample closest to the tip and producing in response thereto a first control voltage applied to the piezoelectric transducer that moves the one of the probe support and the stage along an axis of a first coordinate variable so as to optimize the interaction;
   (d) optical circuitry including
      i. a first corner cube connected in fixed relation to the one of the probe support and stage and producing a first beam of light and means for directing the first beam of light along an axis of the first coordinate variable, the first beam of light moving transversely with respect to the axis of the first coordinate variable in accordance with movement of the one of the probe support and the stage,
      ii. a second corner cube connected in fixed relation to the one of the probe support and stage and producing a second beam of light and means for directing the second beam of light along an axis of a second coordinate variable, the second beam of light moving transversely with respect to the axis of the second coordinate variable in accordance with movement of the one of the probe support and the stage,
      iii. a first position sensitive photodetecting device receiving the first beam of light, the first beam of light producing thereon a first spot of light that moves in accordance with the movement of the one of the probe support and the stage to cause the first position sensitive photodetecting device to produce a first signal representing a value of a third coordinate variable and a second signal representing a value of the second coordinate variable, iv. a second position sensitive photodetecting device receiving the second beam of light, the second beam of light producing thereon a second spot of light that moves in accordance with the movement of the one of the probe support and the stage to cause the second position sensitive photodetecting device to produce a third signal representing a value of the first coordinate variable indicating the present position of the one of the microscope probe and the stage;

(e) a first feedback servo circuit receiving the third signal and a first scanning signal and producing in response thereto a first error signal, and a second servo circuit receiving the second signal and a second scanning signal and producing in response thereto a second error signal; and (f) means responsive to the first and second error signals for producing second and third control voltages applied to the piezoelectric transducer that move the one of the probe support and the stage along axes of the second coordinate variable and the third coordinate variable, respectively.

8. The scanning probe microscope of claim 7 wherein the second, third, and first coordinate variables are cartesian coordinate x, y, and z variables, respectively.

9. The scanning probe microscope of claim 7 wherein the one of the probe support in the stage is the stage.

10. The scanning probe microscope of claim 8 further including means for displaying values of the first, second, and third coordinate variables z, x, and y, respectively.

11. The scanning probe microscope of claim 7 including means for determining a linearity error of the second position sensitive photodetecting device corresponding to a present value of the first coordinate variable and accordingly adjusting the present value of the first coordinate variable to compensate for the linearity error of the second position sensitive photodetecting device.

12. The scanning probe microscope of claim 11 including means for determining linearity errors of the first position sensitive photodetecting device corresponding to present values of the second coordinate variable and the third coordinate variable and accordingly adjusting the present values of the second coordinate variable and the third coordinate variable, whereby the first and second feedback servo circuits cause translation of the piezoelectric transducer 18 along axes of the second coordinate variable and the third coordinate variable to be compensated for the linearity errors of the first position sensitive photodetecting device.

13. A scanning probe microscope, comprising in combination:

(a) a probe support carrying a microscope probe so that a tip of the microscope probe is proximate to a surface of a sample;

(b) a piezoelectric transducer having a free end connected to a stage on which the sample is supported;

(c) probe sensing circuitry connected to sense a signal representative of an interaction between the tip of the probe and a point of the surface of the sample closest to the tip and producing in response thereto a first control voltage applied to a position transducer to move the stage along an axis of a first coordinate variable so as to optimize the interaction;

(d) optical circuitry including
   i. a corner cube connected in fixed relation to the stage and producing a first beam of light;
   ii. means for directing the first beam of light along an axis of a second coordinate variable, the first beam of light moving transversely with respect to the axis of the second coordinate variable in accordance with movement of the stage,
   iii. a position sensitive photodetecting device receiving the first beam of light, the first beam of light producing thereon a first spot of light that moves in accordance with the movement of the stage to cause the position sensitive photodetecting device to produce a first signal representing a value of the second coordinate variable and a second signal representing a value of a third coordinate variable;

(e) a first feedback servo circuit receiving the first signal and a first scanning signal and producing in response thereto a first error signal, and a second servo circuit receiving the second signal and a second scanning signal and producing in response thereto a second error signal;

(f) means responsive to the first and second error signals for producing second and third control voltages applied to the piezoelectric transducer that move the stage along axes of the second coordinate variable and the third coordinate variable, respectively;

(g) an elongated straight optical tube having a longitudinal axis, first and second open ends through which the longitudinal axis extends in the direction of propagation of the beam that is associated with the first coordinate variable, and a wall opening;

(h) the directing means being disposed in the optical tube and including first and second mutually perpendicular reflective surfaces and inclined 45 degrees relative to the longitudinal axis; and (i) a point light source in the first open end transmitting a second beam of light, the first reflective surface directing the first beam through the wall opening into the corner cube causing it to produce the first beam of light and direct the first beam of light through the wall opening to the second reflective surface, the second reflective surface directing the first beam along the longitudinal axis to the position sensitive photodetecting device, the position sensitive photodetecting device being located in the second open end of the tube.

14. The scanning probe microscope of claim 13 wherein the tube is composed of material having a low thermal expansion coefficient.

* * * * *